United States Patent
Haruta et al.

(10) Patent No.: US 11,524,858 B2
(45) Date of Patent: Dec. 13, 2022

(54) HEAT-SHRINKABLE POLYESTER FILM ROLL

(71) Applicant: TOYOBO CO., LTD., Osaka (JP)

(72) Inventors: Masayuki Haruta, Tsuruga (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 122 days.

(21) Appl. No.: 16/964,871

(22) PCT Filed: Jan. 28, 2019

(86) PCT No.: PCT/JP2019/002800
§ 371 (c)(1),
(2) Date: Jul. 24, 2020

(87) PCT Pub. No.: WO2019/151196
PCT Pub. Date: Aug. 8, 2019

(65) Prior Publication Data
US 2021/0061605 A1 Mar. 4, 2021

(30) Foreign Application Priority Data
Jan. 31, 2018 (JP) .............................. JP2018-014530

(51) Int. Cl.
*B65H 18/28* (2006.01)
*B29C 48/08* (2019.01)
(Continued)

(52) U.S. Cl.
CPC ......... *B65H 18/28* (2013.01); *B29C 48/0018* (2019.02); *B29C 48/08* (2019.02);
(Continued)

(58) Field of Classification Search
CPC ............ B65H 18/28; B65H 2701/1842; B29C 48/08; B29C 48/0018; B29C 48/914;
(Continued)

(56) References Cited

U.S. PATENT DOCUMENTS

| 8,728,594 B2 * | 5/2014 | Haruta | .................. B29C 61/003 |
| | | | 428/35.2 |
| 2009/0270584 A1 * | 10/2009 | Endo | ....................... B29C 61/06 |
| | | | 528/308.1 |

(Continued)

FOREIGN PATENT DOCUMENTS

| EP | 2639044 A2 | 9/2013 |
| JP | 2003-266525 A | 9/2003 |

(Continued)

OTHER PUBLICATIONS

Converting Technical Institute, "Possible Problems in Winding and Corrective Measures," The Slitter-Rewinder Technical Reading Book, section 3, pp. 15-21 (1998).

(Continued)

*Primary Examiner* — Sang K Kim
(74) *Attorney, Agent, or Firm* — Leydig, Voit & Mayer, Ltd.

(57) ABSTRACT

The invention provides a heat-shrinkable polyester film roll containing a paper tube and a heat-shrinkable polyester film wound around the paper tube to form the heat-shrinkable polyester film roll, wherein (1) the film winding length is 2000-20000 m, (2) the film width is 400-2500 mm, (3) the film thickness is 5-30 μm, (4) unevenness in thickness in the film widthwise direction in a film roll surface layer part is 12% or less, (5) the paper tube has an inner diameter of 3 inches, a difference in clearance of the paper tube in a widthwise direction after removal of the film from the film roll is 0.5 mm or less, and a flat compressive strength of the paper tube after removal of the film is 1700 N/100 mm or more, and (6) the average value of winding hardness in the widthwise direction in the film roll surface layer part is 500-850.

8 Claims, 3 Drawing Sheets

(51) Int. Cl.
  *B29C 48/00* (2019.01)
  *B29C 55/08* (2006.01)
  *B29C 61/06* (2006.01)
  *B29K 67/00* (2006.01)

(52) U.S. Cl.
  CPC .............. *B29C 55/08* (2013.01); *B29C 61/06* (2013.01); *B29K 2067/00* (2013.01); *B65H 2701/1842* (2013.01)

(58) Field of Classification Search
  CPC ....... B29C 48/305; B29C 61/02; B29C 61/06; B29C 61/065
  See application file for complete search history.

(56) References Cited

U.S. PATENT DOCUMENTS

| | | | | |
|---|---|---|---|---|
| 2009/0304997 | A1* | 12/2009 | Haruta | B29C 55/065 428/156 |
| 2010/0260951 | A1* | 10/2010 | Haruta | G09F 3/04 428/35.1 |
| 2011/0008607 | A1 | 1/2011 | Haruta et al. | |

FOREIGN PATENT DOCUMENTS

| | | |
|---|---|---|
| JP | 2004-203545 A | 7/2004 |
| JP | 3678220 B2 | 8/2005 |
| JP | 2007-262365 A | 10/2007 |
| JP | 2008-195061 A | 8/2008 |
| JP | 2014-073688 A | 4/2014 |
| JP | 2017-024382 A | 2/2017 |

OTHER PUBLICATIONS

Japanese Patent Office, International Search Report in International Patent Application No. PCT/JP2019/002800 (dated Apr. 23, 2013).
China National Intellectual Property Administration, The First Office Action in Chinese Patent Application No. 201980010081.4 (dated Aug. 5, 2021).
European Patent Office, Extended European Search Report in European Patent Application No. 19748240.9 (dated Oct. 1, 2021).
Indian Patent Office, Examination Report in Indian Patent Application No. 202047034464 (dated Dec. 20, 2021).
China National Intellectual Property Administration, Decision of Rejection in Chinese Patent Application No. 201980010081.4 (dated Apr. 25, 2022).

* cited by examiner

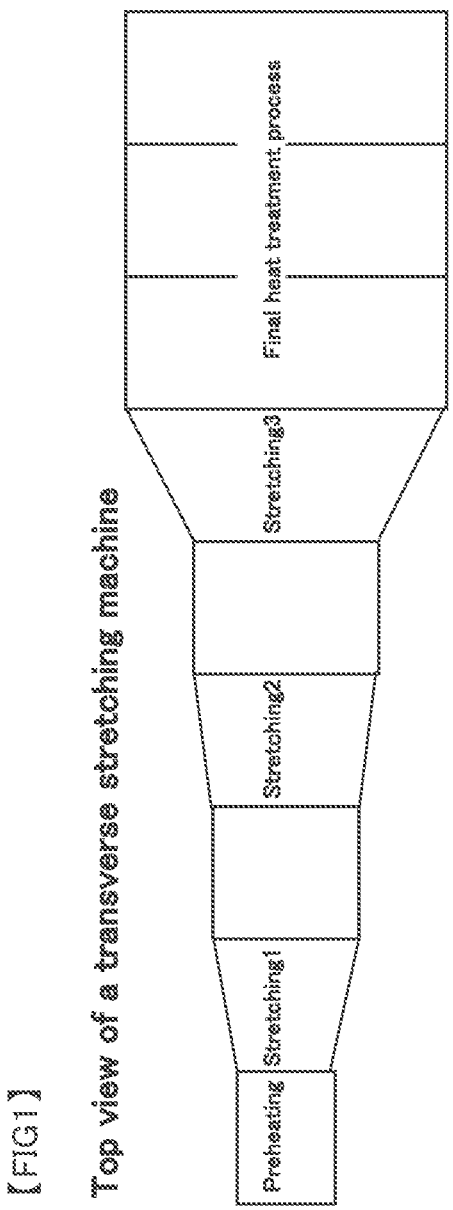

[FIG. 2]
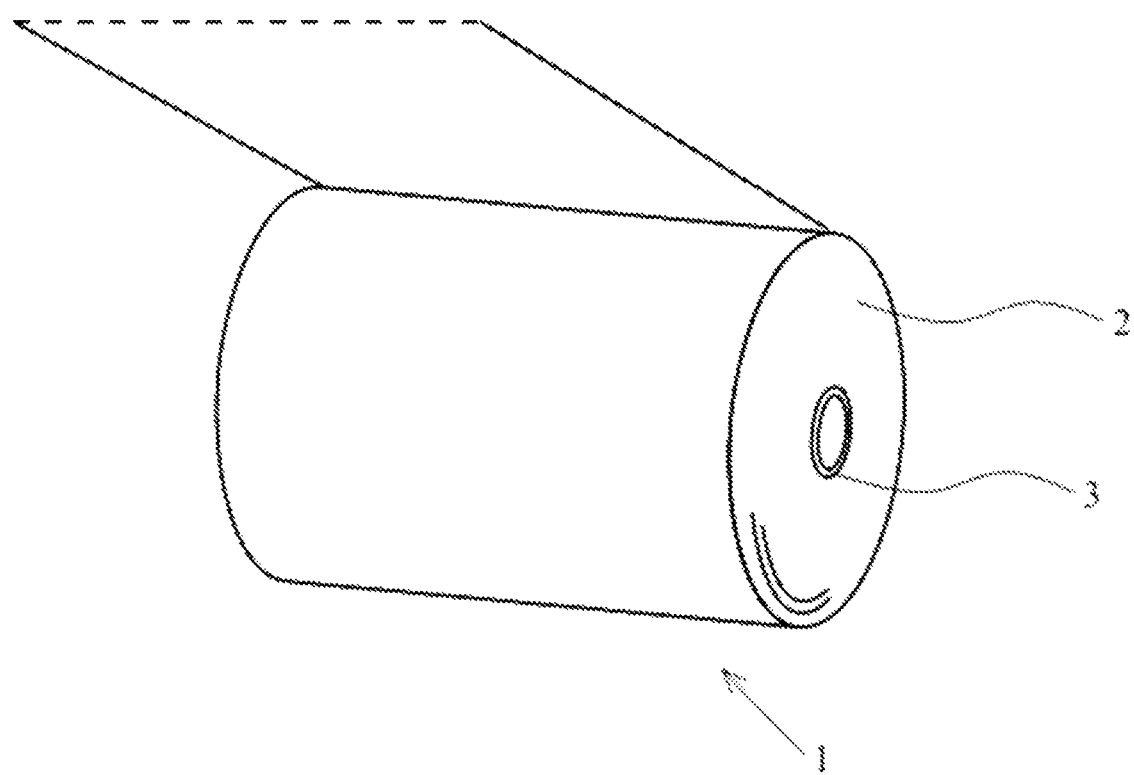

[FIG. 3A]
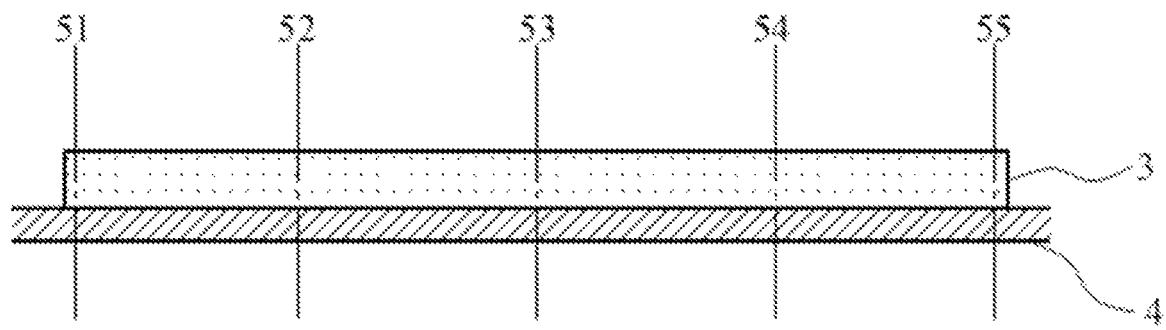
[FIG. 3B]
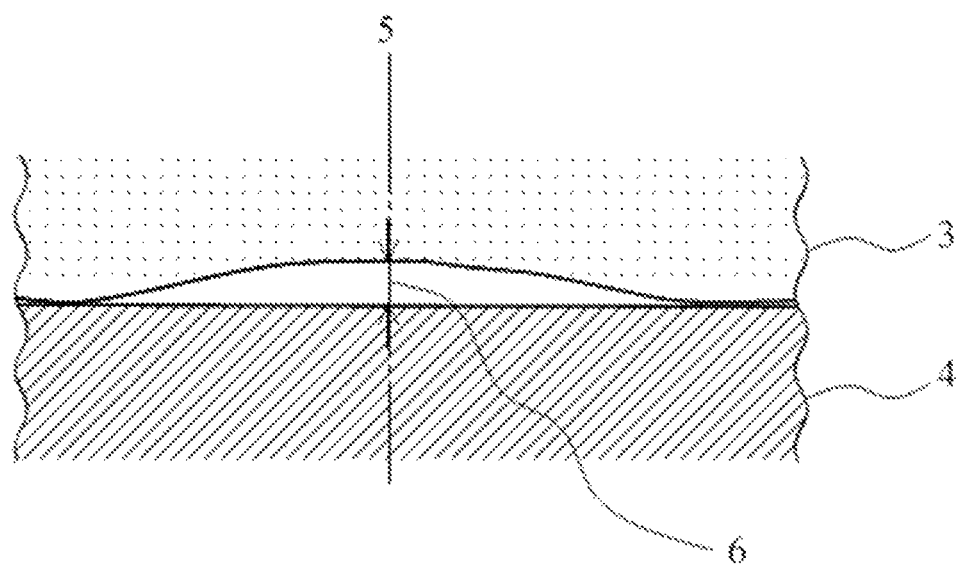

HEAT-SHRINKABLE POLYESTER FILM ROLL

CROSS-REFERENCE TO RELATED APPLICATIONS

This patent application is the U.S. national phase of International Patent Application No. PCT/JP2019/002800, filed Jan. 28, 2019, which claims the benefit of Japanese Patent Application No. 2018-014530, filed Jan. 31, 2018, which are incorporated by reference in their entireties herein.

TECHNICAL FIELD

The present invention relates to a film roll produced by winding a heat-shrinkable polyester film. More specifically, the present invention relates to a heat-shrinkable polyester film roll that is excellent in wrinkling in the winding core part of the film roll, and is small in loss at the time of printing or processing.

BACKGROUND ART

Recently, in applications such as label package doubling as a protection of a glass bottle and a PET bottle etc. and display of articles, cap sealing, and accumulation package, there have been widely used drawn films (so-called heat-shrinkable films) composed of a polyvinyl chloride resin, a polystyrene resin, a polyester resin or the like. Of these heat-shrinkable films, a polyvinyl chloride film has problems that heat resistance is low, and it generates hydrogen chloride gas in incineration and causes dioxin. A polystyrene film has problems that it is inferior in solvent resistance, as well as an ink with a special composition needs to be used in printing, it requires high temperature incineration and generates a lot of black smoke accompanied by an abnormal odor in incineration. Therefore, as a shrink label, there has been widely used a polyester-based heat-shrinkable film which is high in heat resistance, easy to incinerate, and excellent in solvent resistance, and the use amount tends to increase being accompanied by an increase in distribution volume of PET containers.

Heat-shrinkable labels are often disposed of as garbage in the end, so that thinning is requested for responding to environmental demands. Reduction of the thickness leads to decrease in stiffness, and makes the handling more difficult. Therefore, a problem comes out in the film roll after slitting the film. Heat-shrinkable films are difficult to handle compared with other universal films, and according to the examination made by the present inventors, a problem is likely to occur particularly in a heat-shrinkable polyester film especially having a thickness of 30 μm or less. Such a problem causes a trouble in subjecting the film roll to printing or processing. Particularly when wrinkling occurs in the winding core part of the film roll, a trouble arises at that position in printing or processing, and a problem of a loss arises.

RELATED ART DOCUMENTS

Patent Documents

Patent Document 1: JP-A-2003-266525
Patent Document 2: JP-B-3678220
Patent Document 3: JP-A-2014-73688

Non-Patent Documents

Non-patent Document 1: The Slitter-Rewinder Technical reading book, Converting Technical Institute, 1998

DISCLOSURE OF THE INVENTION

Problems to be Solved by the Invention

Many technical literatures concerning the slit condition for making a film roll with less wrinkling have been issued heretofore. Non-patent Document 1 indicates a tension, control and the like of the slitter that winds a film roll. However, Non-patent Document 1 lacks description for a paper tube and physical properties of the film.

In Patent Document 1, uniformity of the winding hardness in the widthwise direction of the film roll is desired as the slit condition that little causes wrinkling or sagging of the film roll. This aims at preventing the film roll from wrinkling or sagging due to an air defect. However, wrinkling due to an air defect is largely influenced in the vicinity of the surface layer of the film roll, and the influence of an air defect is small on the winding core side which is the closest to the paper tube of the film roll, so that wrinkling can occur even when the winding hardness in the widthwise direction is uniform. Patent Document 2 indicates a heat-shrinkable polyester film roll that is small in variation in the heat shrinkage and the solvent bondability in the roll and is excellent in unevenness in thickness. However, Patent Document 2 lacks description for wrinkling of the film roll.

Patent Document 3 indicates a heat-shrinkable polyester film roll that is excellent in processing such as printing even after a long-term storage. However, the difference in winding hardness in the widthwise direction is larger than that in Patent Document 1. Patent Document 3 lacks description for wrinkling on the winding core side.

It is an object of the present invention to solve the problem associated with the film roll produced by winding a conventional thinned heat-shrinkable polyester film, and provide a heat-shrinkable polyester film roll that has little winding core wrinkling.

Solutions to the Problem

In order to solve the above-mentioned problem, the inventors have studied diligently and arrived at the completion of the present invention. That is, the present invention comprises the following.

1. A heat-shrinkable polyester film roll comprising:
a paper tube,
a heat-shrinkable polyester film having a shrinking rate in a main shrinking direction of the film after treated in hot water at 90° C. for 10 seconds of 40% or more, and
the film being wound around the paper tube to form the heat-shrinkable polyester film roll,
wherein the heat-shrinkable polyester film and the film roll satisfy the following requirements (1) to (6):
(1) a film winding length is 2000 in or more and 20000 in or less;
(2) a film width is 400 mm or more and 2500 mm or less;
(3) a film thickness is 5 μm or more and 30 μm or less;
(4) unevenness in thickness in a film widthwise direction in a film roll surface layer part is 12% or less;
(5) the paper tube has an inner diameter of 3 inches, a difference in clearance of the paper tube in a widthwise direction after removal of the film from the film roll is 0.5 mm or less, and a flat compressive strength of the paper tube after removal of the film is 1700 N/100 mm or more; and (6) an average value of winding hardness in a widthwise direction in the film roll surface layer part is 500 or more and 850 or less.

2. The heat-shrinkable polyester film roll according to 1, wherein a difference in clearance of the paper tube in the widthwise direction before winding the film is 0.3 mm or less.

3. The heat-shrinkable polyester film roll according to 1 or 2, wherein unevenness in thickness over the widthwise direction of the film of each sample sampled at intervals of 1000 m of the winding length from the surface layer part of the film roll is 12% or less in all samples.

4. The film roll comprising the heat-shrinkable polyester film according to 1 to 3, wherein both of a coefficient of static friction and a coefficient of dynamic friction between winding outside and winding inside of the film are 0.1 or more and 0.8 or less.

Effects of the Invention

The heat-shrinkable polyester film roll of the present invention has little winding core wrinkling. Therefore, the heat-shrinkable polyester film roll of the present invention suffers from little trouble in printing or a postprocessing such as solvent bonding, and can be favorably.

BRIEF DESCRIPTION OF THE DRAWINGS

FIG. 1 is a top view showing one example of a stretching pattern in a transverse stretching machine for producing a heat-shrinkable polyester film of the present invention.

FIG. 2 is a schematic view of one example of a heat-shrinkable polyester film roll of the present invention, in which a heat-shrinkable polyester film is wound around a paper tube.

FIGS. 3A and 3B are schematic views illustrating a method for measuring a difference in clearance of a paper tube in a widthwise direction, wherein FIG. 3A depicts 5 measurement points, and FIG. 3B depicts an enlarged view of a single measurement point.

MODE FOR CARRYING OUT THE INVENTION

Polyester that is used in the heat-shrinkable polyester film constituting the heat-shrinkable polyester film roll of the present invention contains ethylene terephthalate as a main constituent component. That is, ethylene terephthalate occupies 50% by mol or more, and preferably 60% by mol or more in 100% by mol of all the constituent components of polyester. As to other dicarboxylic acid components constituting the polyester of the present invention other than terephthalic acid, there are exemplified an aromatic dicarboxylic acid such as isophthalic acid, naphthalene-dicarboxylic acid and orthophthalic acid, an aliphatic dicarboxylic acid such as adipic acid, azelaic acid, sebacic acid and decanedicarboxylic acid and an alicyclic dicarboxylic acid.

When an aliphatic dicarboxylic acid (e.g., adipic acid, sebacic acid, decanedicarboxylic acid, and the like) is contained, the content is preferably less than 3% by mol. In the heat-shrinkable polyester film obtained by using a polyester containing 3% by mol or more of such an aliphatic dicarboxylic acid, the film stiffness at the time of high speed attachment is insufficient.

It is preferred that tricarboxylic and higher polycarboxylic acid (such as trimellitic acid, pyromellitic acid and anhydride thereof) is not contained in the polyester. In a heat-shrinkable polyester film prepared by using the polyester containing such polycarboxylic acid, it is difficult to achieve necessary high shrinking rate.

Examples of a diol component other than ethylene glycol constituting the polyester used in the present invention include aliphatic diols such as 1-3 propane diol, 1-4 butane diol, neopentyl glycol, and hexane diol, alicyclic diols such as 1,4-cyclohexanedimethanol, and aromatic diol such as b is phenol A.

The polyester used in the heat-shrinkable polyester film of the present invention is preferably a polyester having a glass transition point (Tg) adjusted to 60 to 80° C. by containing one or more of cyclic diols such as 1,4-cyclohexane dimethanol, or diols having 3 to 6 carbon atoms (e.g., 1-3 propane diol, 1-4 butane diol, neopentyl glycol, hexane diol, and so on).

In the polyester used in the heat-shrinkable polyester film of the present invention, the total of one or more monomer components that can become amorphous components in 100% by mol of polyhydric alcohol component or in 100% by mol of polyvalent carboxylic acid components in the entire polyester resin is preferably 15% by mol or more, more preferably 17% by mol or more, and especially preferably 20% by mol or more. Examples of the monomers that can become amorphous components include neopentyl glycol, 1,4-cyclohexanedimethanol, isophthalic acid, 1,4-cyclohexane dicarboxylic acid, 2,6-naphthalene dicarboxylic acid, 2,2-diethyl 1,3-propanediol, 2-n-butyl 2-ethyl 1,3-propanediol, 2,2-isopropyl 1,3-propanediol, 2,2-di n-butyl 1,3-propanediol, 1,4-butanediol, and hexanediol. And among these, neopentyl glycol, 1,4-cyclohexanedimethanol or isophthalic acid is preferably used.

It is preferred that the polyester used in the heat-shrinkable polyester film of the present invention does not contain a diol having not less than 8 carbons (such as octanediol) or a trihydric or higher polyhydric alcohol (such as trimethylolpropane, trimethylolethane, glycerol or diglycerol). In a heat-shrinkable polyester film prepared by using the polyester containing such diol or polyhydric alcohol, it is difficult to achieve necessary high shrinking rate.

If necessary, various additives such as wax, antioxidant, antistatic agent, crystal nucleus agent, viscosity-reducing agent, heat stabilizer, pigment for coloration, coloration preventer or ultraviolet absorber may be added to the resin which forms the heat-shrinkable polyester film of the present invention. It is preferred that fine particles which make a working property (slipping property) of the film better are added as a lubricant to the resin which forms the heat-shrinkable polyester film of the present invention. Although anything may be selected as the fine particles, examples of the inorganic fine particles include silica, alumina, titanium dioxide, calcium carbonate, kaolin and barium sulfate. And examples of the organic fine particles include acrylic resin particles, melamine resin particles, silicone resin particles and cross-linking polystyrene particles. An average particle size of the fine particles may be appropriately selected upon necessity from a range of 0.05 to 3.0 μm (in case of being measured using a Coulter counter). And, the content of the fine particles is within the range of 300 to 1200 ppm with respect to the film, and it is possible to achieve both good slipping property (friction) and transparency.

As to a method of compounding the above particles with the resin which forms the heat-shrinkable polyester film, although it is possible, for example, to add them in any of stages of producing the polyester resin, it is preferred that the particles are added as a slurry being dispersed in ethylene glycol or the like in a stage of esterification or in a stage after completion of ester interchange and before starting polycondensation reaction followed by proceeding the polycondensation. It is also preferred to conduct it, for example, by a method wherein a slurry of the particles dispersed in ethylene glycol, water or the like is blended with the polyester resin raw materials by using a kneading extruder equipped with a vent or by a method wherein the dried particles and the polyester resin raw materials are blended by using a kneading extruder.

Furthermore, it is also possible that the heat-shrinkable polyester film of the present invention is subjected to a corona treatment, a coating treatment or a flame treatment for improving adhesive property of the film surface.

The heat-shrinkable polyester film of the present invention also includes a laminate-type multilayer polyester film having at least one polyester resin layer. When two or more polyester resin layers are laminated, the polyester resin layers may be of polyesters having the same composition or may be of polyesters having different compositions. The layer that can be laminated as another layer is not particularly limited as long as it is a thermoplastic resin layer, however, a polystyrene resin layer is preferred in terms of the price and the heat shrinkage characteristics.

When the heat-shrinkable polyester-based film of the present invention is immersed for 10 seconds in hot water of 90° C. under an unloaded state for shrinkage, the heat-shrinking rate (i.e., a heat-shrinking rate in hot water of 90° C.) in the main shrinking direction of the film is 40% or more, wherein the heat-shrinking rate is calculated by the following formula 1 from lengths before and after the shrinking.

$$\text{Heat-shrinking rate} = \{[(\text{Length before shrinking}) - (\text{Length after shrinking})]/(\text{Length before shrinking})\} \times 100(\%) \quad \text{Formula 1}$$

A heat-shrinking rate in hot water at 90° C. in the main shrinking direction of less than 40% is unfavorable for a heat-shrinkable film because the shrinking amount is so small that wrinkling or insufficient shrinking occurs in the label after heat shrinkage.

The length of the film that is wound into the heat-shrinkable polyester film roll, or the heat-shrinkable multilayer polyester film roll of the present invention is preferably 2000 m or more and 25000 m or less. In the processing such as printing or the like, the frequency of replacing the roll reduces and the operation efficiency improves as the winding length increases. The length of the film is preferably 3000 m or more, and more preferably 4000 m or more. There is no particular upper limit for the winding length, and the longer the better, however, the upper limit of the winding length was 25000 m because the inventors can examine up to the winding length of 25000 m.

The width of the heat-shrinkable polyester film roll of the present invention is preferably 400 mm or more and 2500 mm or less. There is no particular upper limit for the width of the film roll, and a larger width of the film roll is preferred because the loss is small in the printing step. However, since the inventors can examine up to a width of 2500 mm, the upper limit of the width was 2500 mm. A larger width of the film roll is preferred because the efficiency in the processing such as printing is improved as described above. The width is preferably 500 mm or more, and more preferably 600 mm or more.

The thickness of the heat-shrinkable polyester film of the present invention is preferably 5 μm or more and 30 μm or less. Since the thickness examined in the present invention was down to 5 μm, the thickness was 5 μm or more. A larger thickness tends to be preferred because the stiffness increases and winding core wrinkling decreases, however, reduction of thickness retrogresses for environmental demands.

Unevenness in thickness in the widthwise direction of the film in the surface layer part of the heat-shrinkable polyester film roll of the present invention is 12% or less by the formula represented by the following formula 2. Bad unevenness in thickness is unfavorable because wrinkling becomes easy to occur. Unevenness in thickness is preferably 10% or less, and more preferably 7% or less. A smaller value of the unevenness in thickness is more preferred.

The "surface layer part of the film roll" or "surface layer portion of the film roll" in the present invention means the portion to which 1 m of the film has been removed from the surface layer of the film roll.

$$\{(\text{Maximum value of thickness} - \text{minimum value of thickness}) \div \text{average thickness}\} \times 100(\%) \quad \text{Formula 2}$$

In the heat-shrinkable polyester film roll of the present invention, it is preferred that a difference in clearance in the widthwise direction of the paper tube after removal of the film from the film roll is 0.5 mm or less. Storage of the film wound around the paper tube results in deformation (strain) in the paper tube due to strain in the film, natural shrinkage and the like. At this time, a large difference in strain of the paper tube in the widthwise direction (difference in clearance in the widthwise direction) is unfavorable because wrinkling occurs on the winding core side of the film roll. Therefore, the difference in clearance of the paper tube after removal of the film from the film roll is preferably 0.4 mm or less, and more preferably 0.3 mm or less. The difference in clearance in the widthwise direction of the paper tube can be measured by a method described in the later-described Examples.

As shown in FIGS. 3A and 3B, the difference in clearance in the widthwise direction of the paper tube is obtained by placing the paper tube 3 on a horizontal pedestal 4, measuring the clearance 6 at a position 5 corresponding to each of positions 51-55: positions 51 and 55 located 10 mm from each end part in the widthwise direction, center position 53, and middle positions 52 and 54 located between the center position and the positions of 10 mm from the end parts, and calculating the difference between the maximum clearance and minimum clearance.

While a paper tube, a plastic core, a metallic core and the like are available as the core around which the film is to be wound, a paper tube having an inner diameter of 3 inches that is low in price and excellent in versatility is used in the present invention. The thickness of the paper tube is preferably about 7 to 30 mm.

In the heat-shrinkable polyester film roll of the present invention, it is preferred that the flat compressive strength of the paper tube having a 3-inch core after removal of the film from the film roll is 1700 N/100 mm or more. A compressive strength less than 1700 N/100 mm is unfavorable because the paper tube is distorted due to the internal stress exerted after winding the film, and wrinkling occurs in the roll winding core part. The compressive strength is preferably 1800 N/100 mm or more, and more preferably 1900 N/100 mm or more. A higher compressing strength is more preferred. As a measure for obtaining high flat compressive strength of the paper tube, a method of increasing the thickness of the paper tube, a method of using a hard paper tube or a ultrahard paper tube that is designed to have high strength, and the like can be recited.

In order to make the difference in clearance of the paper tube after removal of the film from the film roll be 0.5 mm or less as described above in the heat-shrinkable polyester film roll of the present invention, the difference in clearance in the widthwise direction of the paper tube to be used in winding before winding the film is preferably 0.3 mm or less, more preferably 0.2 mm or less, and further preferably 0.1 mm or less. As a measure for reducing the difference in clearance of the paper tube, a method of using a paper tube with high hardness that is difficult to deform by vibration during conveyance such as transportation, a method of storing the paper tube in a damp proofing bag until use so as to prevent the paper tube from deforming by absorbing the moisture, or a method of storing the paper tube in a room having a constant temperature and humidity so as to prevent the paper tube from deforming by absorbing the moisture can be recited.

An average value of the winding hardness in the widthwise direction of the heat-shrinkable polyester film roll surface layer of the present invention is preferably 500 or more and 850 or less. An average value of the winding hardness of less than 500 is unfavorable because displacement occurs on the end face of the film roll although the winding state softens and the winding core wrinkling ameliorates. An average value of the winding hardness of more than 850 is unfavorable because the winding state hardens and wrinkling becomes more likely to occur due to unevenness in thickness. The average value of the winding hardness in the widthwise direction of the film roll surface layer is preferably 550 or more and 800 or less, and more preferably 600 or more and 750 or less. Especially preferred is more than 650 and 750 or less. The winding hardness in the present invention means the winding hardness measured by the method described in later-described Examples. A preferred winding method for making the winding hardness fall within the aforementioned predetermined range will be described later.

Both of a coefficient of static friction and a coefficient of dynamic friction between film faces of winding outside and winding inside of the heat-shrinkable polyester film of the present invention are preferably 0.1 or more and 0.8 or less. If the coefficient is less than 0.1, the film is so slippy that displacement of the end face can occur. The coefficient of more than 0.8 is unfavorable because the amount of air involved at the time of slitting is large, and sagging or wrinkling is more likely to occur due to an air defect at the time of film rolling. The coefficient is preferably 0.13 or more and 0.77 or less, and more preferably 0.16 or more and 0.74 or less.

One problem to be solved by the heat-shrinkable polyester film roll of the present invention is to reduce the winding core wrinkling. Winding core wrinkling occurs in slitting the film roll, and a long wrinkle can range over several hundred meters from the winding core part, and this can cause huge loss in subjecting the film roll to a processing such as printing. It is preferred that wrinkling does not occur at a position of a winding length of 30 m or more from the paper tube of the heat-shrinkable polyester film roll of the present invention. A wrinkle existing in the position more than the winding length of 30 m from the paper tube is unfavorable because the wrinkle is contained in a processed article such as a printed article, resulting in loss of the processed particle. Preferably, the winding length from the paper tube where a wrinkle exists is 0 m, namely, no wrinkle exists. In a processing such as printing, however, it is often the case that the winding length of about 30 m from the paper tube is not used due to pass line or the like of the printing machine. For this reason, 30 m was selected.

Hereinafter, a preferred method for producing a heat-shrinkable polyester film roll of the present invention is described.

The heat-shrinkable polyester film of the present invention can be obtained by melt-extruding a polyester raw material by an extruder to form an unstretched film, and stretching and heat-treating the unstretched film by a predetermined method as shown below. For lamination, a plurality of extruders, a feed block, or a multi manifold may be used. Polyester can be obtained by polycondensing the aforementioned preferred dicarboxylic acid component and diol component by a known method. Usually, two or more kinds of polyesters in chip forms are mixed and used as a raw material for a film.

When a mixture of two or more kinds of raw materials is put into an extruder, nonuniformity (so-called raw material segregation) arises in feeding the raw materials, and this causes variation in film composition to result in unevenness in thickness in the widthwise direction. In order to prevent that problem and make the unevenness in thickness fall within the predetermined range in the present invention, it is preferred to provide a stirrer in a pipe or a hopper directly above the extruder, and melt-extrude the raw materials after they are mixed uniformly.

In a specific production method of a film and a label, raw material chips are dried with a dryer such as a hopper dryer or a puddle dryer, or with a vacuum dryer, and the raw materials are mixed uniformly with a stirrer in a hopper above the extruder, and the resultant raw material mixture is extruded at a temperature of 200 to 280° C. into a film form. Alternatively, an undried polyester raw material that is mixed uniformly in the same manner as described above is extruded into a film form in the same manner while the moisture is removed inside the vent-type extruder. For extrusion, while any existing methods including T die method, tubular method and the like may be employed, T die method is preferred for achieving satisfactory unevenness in thickness. The temperature during extrusion is controlled not to exceed 280° C. Too high melting temperature is unfavorable because the limiting viscosity when the film is made into a label decreases, and cracking is more likely to occur.

The shear rate at the dies outlet was determined according to the following formula 3.

Shear Rate $$\gamma = 6Q/(W \times H^2) \qquad \text{Formula 3}$$

$\gamma$: shear rate (sec$^{-1}$)

Q: discharge amount of raw material from extruder (cm$^3$/sec)

W: width of opening of dies outlet (cm)

H: Lip gap of dies (cm)

A higher shear rate is preferred because unevenness in thickness in the widthwise direction of the film (particularly, maximum recess) can be reduced. This is because the pressure at the time of discharge of resin at the T die outlet is stabilized as the shear rate increases. The shear rate is preferably 100 sec$^{-1}$ or more, more preferably 150 sec$^{-1}$ or more, and especially preferably 170 sec$^{-1}$ or more. While a higher draft ratio is preferred because the unevenness in thickness in the longitudinal direction is satisfactory, too high draft ratio is unfavorable because a resin debris or the like adheres to the resin discharge part of the dies, and the productivity is impaired.

After extrusion, the film is rapidly cooled to obtain an unstretched film. It is to be noted that the "unstretched film" includes a film on which a tension required for film feeding is acted. As a method for rapidly cooling the molten resin, a method of obtaining a substantially unoriented resin sheet by casting the molten resin on the rotary drum from the mouth piece to rapidly cool and solidify the molten resin can be preferably employed.

Then, the unstretched film obtained in the above is preheated at 80 to 120° C., preferably 90 to 110° C. as necessary with a transverse stretching machine (so-called tenter), and then stretched in the transverse direction (the direction perpendicular to the extruding direction) at a stretch ratio of 3.5 times or more, preferably 4 times or more and 7 times or less. The stretching temperature is 65° C. or higher and 80° C. or lower, and preferably 70° C. or higher and 75° C. or lower.

It is preferred that the transverse stretching is multi-stage stretching in two or more stages and five or less stages. The multi-stage stretching is preferred because it becomes possible to change the stretching stress by varying the respective stretching temperatures of the stages, and it is possible to decrease the unevenness in thickness in the widthwise direction. Three or more-stage stretching is preferred. An example of a stretching pattern of a transverse stretching machine (three-stage stretching) is shown in FIG. 1. As shown in FIG. 1, it is preferred to provide such a pattern that a constant length is maintained after completion of stretching in each stage in the multi-stage stretching. Also, it is preferred to employ such a temperature pattern that the temperature is lowered from the first-stage stretching toward the last-stage stretching with a temperature difference of 2° C. or higher between individual stages of stretching.

After the transverse stretching, it is preferred to conduct a heat treatment at a temperature 1° C. to 30° C. higher than the stretching temperature. The heat treatment is conducted to release the tensioned state of the film after stretching, and is effective for adjusting the heat-shrinking rate at the temperature of the heat treatment and reducing the natural shrinking rate. In this manner, a heat-shrinkable polyester film that is to be a label of the present invention is obtained.

The obtained heat-shrinkable polyester film is wound as a broad width roll which is an intermediate product, and then slit to have a specified width and winding length by using a slitter, and wound around a 3-inch paper tube to obtain a heat-shrinkable polyester film roll. Preferred winding length and width of the film roll are as described above. FIG. 2 shows a heat-shrinkable polyester film roll 1 comprising a heat-shrinkable polyester film 2 wound around a paper tube 3.

In addition, it is preferred to reduce the winding core wrinkling occurring in slitting by employing the following slitting conditions. It is possible to reduce the winding core wrinkling and control the end face displacement as described below.

As specific slitting conditions, slitting starts at an initial tension of 70 to 140 N/m, preferably 80 to 130 N/m, and an initial bearing stress of 200 to 400 N/m, preferably 250 to 350 N/m. An initial tension of higher than 140 N/m is unfavorable because a thickness uneven part is slightly stretched by the tension at the time of slitting to cause wrinkling (winding core wrinkling) and sagging. Furthermore, if the initial tension is higher than 140 N/m, the influence of small bending or strain of the paper tube increases to cause winding core wrinkling. An initial tension of 70 N/m or less is unfavorable because the tension is insufficient in winding the film after slitting, and the end face of the film roll becomes uneven (so-called end face displacement). It is desired that the tension is decreased constantly in correlation with the winding length so that the tension at a winding length of 800 m before end of slitting is 50 to 80%, preferably 60 to 70% of the initial tension, and thereafter the winding is conducted at a constant tension until the end of winding. The bearing stress is preferably ±5% or less of the initial bearing stress as much as possible, and more preferably ±3% or less of the initial bearing stress over the entire length of the winding length.

The winding hardness of the film roll surface layer part that is slit in the manner as described above is preferably 500 or more and 850 or less. A preferred range in the average value of winding hardness in the widthwise direction of the film roll surface layer part is as described above.

The end face displacement of the film roll in the present invention means the end face displacement measured by the method described in later-described Examples. It is preferred that the end face displacement of the film roll is 2 mm or less. When the end face displacement is large, pitch displacement in printing is more likely to occur, particularly, in multi-colored printing or the like. This can impair the design in a finished article such as a label and also impair the commercial value.

In a general film roll that is industrially produced, a continuously prepared film is continuously wound, and the degree of unevenness in thickness in the widthwise direction of the film is substantially constant over the entire length of the winding length when the film preparing condition is constant. However, when a minute variation in each step in the film preparation occurs, the degree of unevenness in thickness in the widthwise direction of the film has a slight variation for the entire length of the winding length. It is preferred that the unevenness in thickness in the widthwise direction of film is controlled over the entire length of the winding length. Whether the unevenness in thickness is controlled over the entire length of the winding length can be confirmed by collecting, for example, a sample of the film of the film roll at regular intervals of the winding length from the surface layer, and measuring unevenness in thickness of each sample. In the film roll of the present invention, unevenness in thickness can be measured by collecting a sample of the surface layer part of the film roll, and taking the measurement as a representative value in the film roll. In the present invention, as described in the later-described Examples, a sample is collected from the part resulting by removal of 1 m of the film from the surface layer of the film roll, and a measurement of the sample is taken as a representative value. A preferred range of unevenness in thickness in the widthwise direction of the film in the film roll surface layer part is as described above.

In a preferred mode of the present invention, when a sample is collected every 1000 m of the winding length from the film roll surface layer part, unevenness in thickness falls within the predetermined range for all the samples. A preferred range of unevenness in thickness in the widthwise direction of film in the entire length of the film roll is as described above.

EXAMPLES

The present invention will now be more specifically illustrated by way of Examples and Comparative Examples although the present invention is never limited to the embodiments of such Examples but may be appropriately modified within a scope of the gist of the present invention.

Evaluation methods used in the present invention are as follows. Unless otherwise described, 1 m of the film was removed from the film roll surface layer, and the film or the film roll in the surface layer portion after the removal was evaluated.

[Heat-Shrinking Rate in a Main Shrinking Direction]

A film was cut into squares each being in a size of 10 cm×10 cm to make a film sample. Then, the sample was immersed for 10 seconds under an unloaded state in hot water 90° C.±0.5° C. for heat-shrinkage. After the sample was taken out from hot water, size of the film in a lateral direction (a main shrinking direction) was measured and the heat-shrinking rate was determined according to the following formula (1).

$$\text{Heat-shrinking rate} = \{[(\text{Length before shrinking}) - (\text{Length after shrinking})]/(\text{Length before shrinking})\} \times 100(\%) \quad \text{Formula (1)}$$

[Unevenness in Thickness Over Widthwise Direction]

A roll was placed in the slitter. Then, after removing 1 m of the film from the roll surface layer, the film roll was sampled over the entire width in the widthwise direction and every 40 mm in the longitudinal direction, and the thickness in the widthwise direction was measured continuously at 5 m/minute using a continuous contacting type thickness meter available from MIKURON.COM. Letting the maximum thickness at the time of measurement be Tmax., the minimum thickness be Tmin., and the average thickness be Tave., unevenness in thickness in the film widthwise direction was calculated according to the following formula (2).

$$\text{Unevenness in thickness} = \{(\text{Tmax.} - \text{Tmin.})/\text{Tave.}\} \times 100(\%) \quad \text{Formula (2)}$$

[Evaluation of Winding Core Wrinkling]

Rewinding was conducted from the film roll to the winding length position of display length of −300 m. Thereafter, slitting was conducted up to the paper tube position at a velocity of 30 m/min, and wrinkling was visually checked. Evaluation was made according to whether wrinkling occurs at a position from 30 m to 300 m of the winding length from the paper tube.

No wrinkling: ○

Wrinkling observed at one or more positions: x

[Strain of Paper Tube in Widthwise Direction]

A paper tube was placed on a horizontal pedestal, difference was measured at a total of five positions: positions of 10 mm from both end parts in the widthwise direction, a center position, and middle positions between the center position and the positions of 10 mm from end parts. The value at each position was obtained by measuring the clearance by using a thickness gauge while the paper tube was rotated once on the horizontal pedestal. The maximum clearance in one rotation of the paper tube was regarded as the clearance at the individual position. Then, the clearances at the five positions in the widthwise direction (a total of five positions including three center positions of the paper tube, and two middle positions between the center part and both ends) were determined, and the difference between the maximum clearance and the minimum clearance was regarded as a strain of the paper tube.

[Strain of Paper Tube after Removal of Film]

The film was rewound from the film roll to remove the film. The paper tube that was left after the removal was measured in the manner as described above.

[Flat Compressive Strength of Paper Tube]

The paper tube was cut in the widthwise direction to have a length of 100 mm. Measurement was conducted by compressing the cut paper tube at a velocity of 20 min/min with a pressure tester (AGS-G) available from Shimadzu Corporation.

[Coefficient of Friction]

In conformity with JIS K-7125, a coefficient of static friction and a coefficient of dynamic friction were determined when the front face and the back face of the film were bonded in an environment of 23° C., 65% RH using a tensile tester (TENSILON available from ORIENTEC CORPORATION). The weight of the sled (weight) around which the upper film was wound was 1.5 kg, and the bottom area size of the sled was 63 mm in length×63 mm in width. The stress rate in measurement of friction was 200 mm/min.

[Evaluation of Winding Hardness]

Measurement was conducted at an interval of 100 mm from the end part in the roll widthwise direction using a hardness tester PAROtester 2 available from Swiss Proceq. An average value measured in the roll widthwise direction was used as a measurement.

[End Face Displacement of Film Roll]

The end face displacement was determined from the difference between the maximum value and the minimum value of irregularity of the end face using a die ruler. The evaluation was made according the following criteria.

2 mm or less: ○

More than 2 mm: x

[Preparation of Polyester Raw Material]

Synthesis Example 1 (Synthesis of Polyester)

An esterification reaction can was charged with 57036 parts by mass of terephthalic acid (TPA), 33244 parts by mass of ethylene glycol (EG), 15733 parts by mass of neopentyl glycol (NPG), 23.2 parts by mass of antimony trioxide as a polycondensation catalyst, 5.0 parts by mass of sodium acetate (alkali metal compound), and 46.1 parts by mass of trimethylphosphate (phosphorus compound), and the pressure was adjusted to 0.25 MPa, and the reactant was stirred at 220 to 240° C. for 120 minutes to cause esterification reaction. The reaction can was recovered to the normal pressure, and 3.0 parts by mass of cobalt acetate tetrahydrate and 124.1 parts by mass of magnesium acetate tetrahydrate were added, and the reactant was stirred at 240° C. for 10 minutes, and the pressure was reduced to 1.33 hPa over 75 minutes while the temperature was elevated to 280° C. Stirring was continued (about 70 minutes) until the melt viscosity was 4500 poises at 280° C., and then the reactant was discharged in the form of strand into water. The discharged matter was cut with a strand cutter to obtain chip B. The limiting viscosity of chip B was 0.73 dl/g.

Synthesis Example 2

Chips A, C having the compositions shown in Table 1 were obtained in the same method as that in Synthesis Example 1. In the table, NPG is an abbreviation for neopentyl glycol, BD is an abbreviation for butane diol, and CHDM is an abbreviation for cyclohexane dimethanol. In chip A, $SiO_2$ (Sylysia 266 available from FUJI SILYSIA CHEMICAL. LTD) serving as a lubricant was added in a rate of 4,500 ppm with respect to polyester. The limiting viscosity was 0.73 dl/g in chips A, C, E, and 0.92 dl/g in chip D.

TABLE 1

| | Composition of polyester raw material (mol %) | | | | | Addition amount of lubricant (ppm) |
|---|---|---|---|---|---|---|
| | Dicarboxylic acid component | Polyhydric alcohol components | | | | |
| | DMT | EG | NPG | BD | CHDM | |
| Chip A | 100 | 100 | — | — | — | 4500 |
| Chip B | 100 | 100 | — | — | — | 0 |
| Chip C | 100 | 70 | 30 | — | — | 0 |
| Chip D | 100 | — | — | 100 | — | 0 |
| Chip E | 100 | 70 | — | — | 30 | 0 |

Example 1

<Production Method of Heat-Shrinkable Film>

The aforementioned chip A, chip B, chip C, and chip D were preliminarily dried separately, and as shown in Table 2, 15% by mass of chip A, 5% by mass of chip B, 70% by mass of chip C, and 10% by mass of chip D were mixed and introduced into an extruder. At this time, three kinds of raw materials were introduced into the extruder while they were stirred with a stirrer directly above the extruder. The mixed resin was melted at 260° C., and extruded from the T die in the conditions of a shear rate of 440 sec$^{-1}$, and a velocity of 50 m/min, and the extrudate was brought into contact with a rotating metal roll that was cooled to have a surface temperature of 25° C. to be rapidly cooled to obtain an unstretched film having a thickness of 110 pin. Tg of the unstretched film at this time was 69° C.

The unstretched film was guided to a tenter (transverse stretching machine). The film was heated to a temperature of the preheating step of 89° C. Thereafter, in the first-stage stretching step, the film was stretched in a stretch ratio of 1.5 times at a stretching temperature of 80° C. The first-stage stretched film was held at 75° C., and then stretched in a stretch ratio of 1.5 times (2.25 times in total) at 75° C. in the second-stage stretching step. The second-stage stretched film was held at 70° C., and then stretched in a stretch ratio of 2.44 times (5.5 times in total) at 70° C. in the third-stage stretching step. The film that was transversely stretched in a stretch ratio of 5.5 times in the third stage was heat-treated at 80° C. for 10 seconds in a tensioned state. Then, after cooling, both edge parts were cut off, and the film was wound into a roll having a width of 4600 mm, to continuously produce a stretched film having a thickness of 20 μm for a predetermined length.

The obtained transversely stretched film was slit to have widths of 2500 mm, 1500 mm, and 600 mm, and a winding length of 20000 m with a slitter.

As specific slitting conditions, slitting started at an initial tension of 120 N/m, and an initial bearing stress of 270 N/m. The tension was reduced at a rate of 0.239%/m in the winding length from 500 m to 19200 m, and the tension was set to be 75 N/m in the winding length from 19200 m to 20000 m. Slitting was conducted so that the bearing stress was constantly 270 N/m. Slitting was conducted in this manner to give film rolls having widths of 2500 mm, 1500 mm, and 600 mm, respectively, and a winding length of 20000 m. Characteristics of the obtained film and the film rolls were evaluated in the methods as described above. The evaluation results are shown in Table 3. A film having target characteristics was obtained, and excellent results were obtained in terms of the winding core wrinkling and the end face displacement of the film roll.

Example 2

Film rolls were obtained in the same manner as that in Example 1 except that chip C was changed to chip E. Tg at this time was 69° C.

Characteristics of the obtained film and the film rolls were evaluated in the methods as described above. The evaluation results are shown in Table 3. The obtained film and film rolls showed excellent results as with the case of Example 1.

Example 3

As slitting conditions, slitting started at an initial tension of 120 N/m, and an initial bearing stress of 270 N/m. The tension was reduced at a rate of 0.239%/m in the winding length from 500 m to 24200 m, and the tension was set to be 75 N/m in the winding length from 24200 m to 25000 m. Slitting was conducted so that the bearing stress was constantly 270 N/m. Slitting was conducted in this manner to give film rolls having widths of 2500 mm, 1500 mm, and 600 mm, respectively, and a winding length of 20000 m. The same method as that in Example 1 was employed except for the winding length of the film rolls and the winding length where the tension was reduced. Film rolls were obtained.

Characteristics of the obtained film and the film rolls were evaluated in the methods as described above. The evaluation results are shown in Table 3. The obtained film and film rolls showed excellent results as with the case of Example 1.

Example 4

Extrusion from the T die was conducted in the conditions of a shear rate of 198 sec$^{-1}$, and a velocity of 50 m/min, and the extrudate was brought into contact with a rotating metal roll that was cooled to have a surface temperature of 25° C. to be rapidly cooled to obtain an unstretched film having a thickness of 50 μm. The stretching temperature of the first stage was changed to 75° C., and the stretching temperature of the second stage and the third stage was changed to 70° C., and slitting started at an initial tension of 120 N/m, and an initial bearing stress of 280 N/m as slitting conditions. A film having a thickness of 9 μm and film rolls were obtained in the same manner as that in Example 1 except that the tension was reduced at a rate of 0.239%/m in the winding length from 500 m to 19200 in, and the tension was set to be 60 N/m in the winding length from 19200 m to 20000 m.

Characteristics of the obtained film and the film rolls were evaluated in the methods as described above. The evaluation results are shown in Table 3. The obtained film and film rolls showed excellent results as with the case of Example 1.

Example 5

Extrusion from the T die was conducted in the conditions of a shear rate of 550 sec$^{-1}$, and a velocity of 50 m/min, and the extrudate was brought into contact with a rotating metal roll that was cooled to have a surface temperature of 25° C. to be rapidly cooled to obtain an unstretched film having a thickness of 138 μm. As slitting conditions, slitting started at an initial tension of 120 N/m, and an initial bearing stress of 270 N/m. The tension was reduced at a rate of 0.239%/m in the winding length from 500 in to 3200 m, and the tension was set to be 75 N/m in the winding length from 3200 m to 4000 m. Slitting was conducted so that the bearing stress was constantly 270 N/m. Slitting was conducted in this manner to give film rolls having widths of 2500 mm, 1500 mm, and 600 mm, respectively, and a winding length of 4000 m. A film having a thickness of 25 µm and film rolls were obtained in the same manner as that in Example 1 except for that. Characteristics of the obtained film and the film rolls were evaluated in the methods as described above. The evaluation results are shown in Table 3. The obtained film and film rolls showed excellent results as with the case of Example 1.

Reference Example 1

The aforementioned chip A, chip B, chip C, and chip D were preliminarily dried separately, and as shown in Table 2, 15% by mass of chip A, 5% by mass of chip B, 70% by mass of chip C, and 10% by mass of chip D were mixed and introduced into an extruder. At this time, three kinds of raw materials were introduced into the extruder while they were stirred with a stirrer directly above the extruder. The mixed resin was melted at 260° C., and extruded from the T die in the conditions of a shear rate of 440 sec$^{-1}$, and a velocity of 50 m/min, and the extrudate was brought into contact with a rotating metal roll that was cooled to have a surface temperature of 25° C. to be rapidly cooled to obtain an unstretched film having a thickness of 110 µm. Tg of the unstretched film at this time was 69° C.

The unstretched film was guided to a tenter (transverse stretching machine). The film was heated to a temperature of the preheating step of 90° C. Then, the film was stretched in a stretch ratio of 5.5 times at 75° C. The film that was transversely stretched in a stretch ratio of 5.5 times was heat-treated at 80° C. for 10 seconds in a tensioned state. Then, after cooling, both edge parts were cut off, and the film was wound into a roll having a width of 4600 mm, to continuously produce a stretched film having a thickness of 20 µm for a predetermined length.

The obtained transversely stretched film was slit to have widths of 2500 mm, 1500 mm, and 600 mm, and a winding length of 20000 m with a slitter.

As specific slitting conditions, slitting started at an initial tension of 120 N/m, and an initial bearing stress of 270 N/m. The tension was reduced at a rate of 0.239%/m in the winding length from 500 m to 19200 m, and the tension was set to be 75 N/m in the winding length from 19200 m to 20000 m. Slitting was conducted so that the bearing stress was constantly 270 N/m. Slitting was conducted in this manner to give film rolls having widths of 2500 mm, 1500 mm, and 600 mm, respectively, and a winding length of 20000 m. Characteristics of the obtained film and the film rolls were evaluated in the methods as described above. The evaluation results are shown in Table 3.

The film rolls having a slit width of 2500 mm and 1500 mm were poor in unevenness in thickness, and poor in winding core wrinkling. On the other hand, regarding the film roll having a slit width of 600 mm, a film having target characteristics was obtained, and excellent results were obtained in terms of the winding core wrinkling and the end face displacement of the film roll.

Comparative Example 1

A film and a film rolls were obtained in the same manner as that in Example 1 except that the flat compressive strength of the paper tube before slitting was 1500 N/100 mm.

Characteristics of the obtained film and the film rolls were evaluated in the methods as described above. The evaluation results are shown in Table 3. In the obtained film and film rolls, the difference in clearance in the widthwise direction of the paper tube after removal of the film was large, and the winding core wrinkling and the end face displacement of the film rolls were poor.

Comparative Example 2

A film and a film rolls were obtained in the same manner as that in Example 1 except that the difference in clearance in the widthwise direction of the paper tube before slitting was large.

Characteristics of the obtained film and the film rolls were evaluated in the methods as described above. The evaluation results are shown in Table 3. In the obtained film and film rolls, also the difference in clearance in the widthwise direction of the paper tube after removal of the film was large, and the winding core wrinkling and the end face displacement of the film rolls were poor.

Comparative Example 3

As slitting conditions, slitting started at an initial tension of 120 N/m, and an initial bearing stress of 180 N/m. The tension was reduced at a rate of 0.239%/m in the winding length from 500 m to 19200 m, and the tension was set to be 60 N/m in the winding length from 19200 m to 20000 m. Slitting was conducted so that the bearing stress was constantly 180 N/m. Slitting was conducted in this manner to give film rolls having widths of 2500 mm, 1500 mm, and 600 mm, respectively, and a winding length of 20000 m. The same method as that in Example 1 was employed except for the winding length of the film rolls and the winding length where the tension was reduced. Film rolls were obtained.

Characteristics of the obtained film and the film rolls were evaluated in the methods as described above. The evaluation results are shown in Table 3. The obtained film and film rolls were low in the winding hardness of the surface layer, and poor in the end face displacement.

TABLE 2

| | Resin composition | Monomer content of amorphous component (mol %) | Stirrer directly above the extrude | Extrusion shear rate (sec$^{-1}$) | Transverse stretching condition | | | | | | |
|---|---|---|---|---|---|---|---|---|---|---|---|
| | | | | | Preheating temperature (° C.) | Stretching temperatures(° C.) | | | Stretch ratio (times) | | |
| | | | | | | First-stage | Second-stage | Third-stage | First-stage | Second-stage | Third-stage |
| Example 1 | A/B/C/D = 15/5/70/10 | 21 | use | 440 | 89 | 80 | 75 | 70 | 1.5 | 1.5 | 2.44 |
| Example 2 | A/B/D/E = 15/5/10/70 | 21 | use | 440 | 89 | 80 | 75 | 70 | 1.5 | 1.5 | 2.44 |
| Example 3 | A/B/C/D = 15/5/70/10 | 21 | use | 440 | 89 | 80 | 75 | 70 | 1.5 | 1.5 | 2.44 |

TABLE 2-continued

| | | | | | | | | | | | |
|---|---|---|---|---|---|---|---|---|---|---|---|
| Example 4 | A/B/C/D = 15/5/70/10 | 21 | use | 198 | 85 | 75 | 70 | 70 | 1.5 | 1.5 | 2.44 |
| Example 5 | A/B/C/D = 15/5/70/10 | 21 | use | 550 | 90 | 80 | 75 | 70 | 1.5 | 1.5 | 2.44 |
| Reference example 1 | A/B/C/D = 15/5/70/10 | 21 | no use | 440 | 90 | performed at 75° C. with only 1-step stretching | | | | | |
| Comparative Example 1 | A/B/C/D = 15/5/70/10 | 21 | use | 440 | 89 | 80 | 75 | 70 | 1.5 | 1.5 | 2.44 |
| Comparative Example 2 | A/B/C/D = 15/5/70/10 | 21 | use | 440 | 89 | 80 | 75 | 70 | 1.5 | 1.5 | 2.44 |
| Comparative Example 3 | A/B/C/D = 15/5/70/10 | 21 | use | 440 | 89 | 80 | 75 | 70 | 1.5 | 1.5 | 2.44 |

| | Transverse stretching condition | | Slitting conditions | | |
|---|---|---|---|---|---|
| | Total stretch ratio (times) | Final heat treatment temperature (° C.) | Initial tension (N/m) | Final tension (N/m) | Bearing stress (N/m) |
| Example 1 | 5.5 | 80 | 120 | 75 | 270 |
| Example 2 | 5.5 | 80 | 120 | 75 | 270 |
| Example 3 | 5.5 | 80 | 120 | 75 | 270 |
| Example 4 | 5.5 | 80 | 120 | 60 | 280 |
| Example 5 | 5.5 | 80 | 120 | 75 | 270 |
| Reference example 1 | 5.5 | 80 | 120 | 75 | 270 |
| Comparative Example 1 | 5.5 | 80 | 120 | 75 | 270 |
| Comparative Example 2 | 5.5 | 80 | 120 | 75 | 270 |
| Comparative Example 3 | 5.5 | 80 | 120 | 60 | 180 |

TABLE 3

| | Width of film roll(mm) | Winding length of film roll(m) | Average thicness (μm) | Shrinking rate in 90° C. widthwise direction(%) | Unevenness in thickness in the total widthwise direction of the film in the surface layer part of the film roll(%) | Maximum vallue of unevenness in thickness in the widthwise direction from the roll surface layer of 1000 m to the core every 1000 m(%) | Difference in clearance in the widthwise direction of the paper tube(mm) Before slitting | After removal of film |
|---|---|---|---|---|---|---|---|---|
| Example 1 | 2500 | 20000 | 20 | 78 | 7 | 8.5 | 0.2 | 0.3 |
| | 1500 | 20000 | 20 | 78 | 5 | 7 | 0.1 | 0.2 |
| | 600 | 20000 | 20 | 78 | 4 | 5 | 0.1 | 0.2 |
| Example 2 | 2500 | 20000 | 20 | 79 | 8 | 9.8 | 0.2 | 0.3 |
| | 1500 | 20000 | 20 | 79 | 6 | 7.5 | 0.1 | 0.2 |
| | 600 | 20000 | 20 | 79 | 4.5 | 5.5 | 0.1 | 0.1 |
| Example 3 | 2500 | 25000 | 20 | 78 | 7 | 8.7 | 0.1 | 0.2 |
| | 1500 | 25000 | 20 | 78 | 5 | 7.2 | 0.1 | 0.2 |
| | 600 | 25000 | 20 | 78 | 4 | 5.5 | 0.1 | 0.1 |
| Example 4 | 2500 | 20000 | 9 | 74 | 9 | 12 | 0.1 | 0.1 |
| | 1500 | 20000 | 9 | 74 | 7 | 10 | 0.1 | 0.1 |
| | 600 | 20000 | 9 | 73 | 6 | 8 | 0.1 | 0.1 |
| Example 5 | 2500 | 4000 | 25 | 78 | 5 | 5.5 | 0.1 | 0.2 |
| | 1500 | 4000 | 25 | 79 | 4 | 4 | 0.1 | 0.1 |
| | 600 | 4000 | 25 | 79 | 3.5 | 4 | 0.1 | 0.1 |
| Reference example 1 | 2500 | 20000 | 20 | 73 | 14 | 16.5 | 0.2 | 0.3 |
| | 1500 | 20000 | 20 | 73 | 13 | 15 | 0.1 | 0.1 |
| | 600 | 20000 | 20 | 73 | 10 | 12 | 0.1 | 0.1 |
| Comparative Example 1 | 2500 | 20000 | 20 | 78 | 7 | 8.5 | 0.1 | 0.7 |
| | 1500 | 20000 | 20 | 78 | 5 | 7 | 0.1 | 0.6 |
| | 600 | 20000 | 20 | 78 | 4 | 5 | 0.1 | 0.6 |
| Comparative Example 2 | 2500 | 20000 | 20 | 78 | 7 | 9 | 0.6 | 0.7 |
| | 1500 | 20000 | 20 | 78 | 6 | 7 | 0.6 | 0.6 |
| | 600 | 20000 | 20 | 78 | 4 | 5 | 0.6 | 0.6 |
| Comparative Example 3 | 2500 | 20000 | 20 | 78 | 6 | 8 | 0.1 | 0.2 |
| | 1500 | 20000 | 20 | 77 | 5.5 | 8 | 0.1 | 0.1 |
| | 600 | 20000 | 20 | 78 | 4 | 5 | 0.1 | 0.1 |

TABLE 3-continued

| | Flat compressive strength of the paper tube(N/100 mm) | | Coefficient of static friction | Coefficient of dynamic friction | Winding hardness of film roll surface layer | Existence of winding core wrinkling (Winding core 30 m to 300 m) | End face displacement |
|---|---|---|---|---|---|---|---|
| | Before slitting | After removal of film | | | | | |
| Example 1 | 2450 | 2420 | 0.047 | 0.04 | 688 | ○ | ○ |
| | 2450 | 2440 | 0.046 | 0.039 | 677 | ○ | ○ |
| | 2450 | 2430 | 0.046 | 0.039 | 700 | ○ | ○ |
| Example 2 | 2450 | 2440 | 0.44 | 0.037 | 695 | ○ | ○ |
| | 2450 | 2440 | 0.045 | 0.038 | 685 | ○ | ○ |
| | 2450 | 2450 | 0.042 | 0.037 | 690 | ○ | ○ |
| Example 3 | 2450 | 2440 | 0.046 | 0.038 | 670 | ○ | ○ |
| | 2450 | 2440 | 0.044 | 0.038 | 668 | ○ | ○ |
| | 2450 | 2450 | 0.045 | 0.038 | 680 | ○ | ○ |
| Example 4 | 2450 | 2450 | 0.045 | 0.038 | 735 | ○ | ○ |
| | 2450 | 2440 | 0.044 | 0.039 | 733 | ○ | ○ |
| | 2450 | 2440 | 0.043 | 0.037 | 720 | ○ | ○ |
| Example 5 | 2450 | 2430 | 0.045 | 0.039 | 700 | ○ | ○ |
| | 2450 | 2420 | 0.047 | 0.039 | 710 | ○ | ○ |
| | 2450 | 2430 | 0.043 | 0.037 | 710 | ○ | ○ |
| Reference example 1 | 2450 | 2450 | 0.047 | 0.04 | 695 | x | ○ |
| | 2450 | 2440 | 0.046 | 0.041 | 706 | x | ○ |
| | 2450 | 2440 | 0.047 | 0.04 | 715 | ○ | ○ |
| Comparative Example 1 | 1500 | 1450 | 0.046 | 0.039 | 690 | x | x |
| | 1500 | 1440 | 0.046 | 0.04 | 680 | x | x |
| | 1500 | 1470 | 0.045 | 0.04 | 670 | x | x |
| Comparative Example 2 | 2450 | 2430 | 0.045 | 0.038 | 690 | x | x |
| | 2450 | 2440 | 0.044 | 0.038 | 700 | x | x |
| | 2450 | 2440 | 0.043 | 0.039 | 675 | x | x |
| Comparative Example 3 | 2450 | 2450 | 0.046 | 0.04 | 350 | ○ | x |
| | 2450 | 2440 | 0.046 | 0.04 | 330 | ○ | x |
| | 2450 | 2440 | 0.045 | 0.04 | 370 | ○ | x |

INDUSTRIAL APPLICABILITY

Since the heat-shrinkable polyester film roll of the present invention is excellent in the winding core wrinkling and the end face displacement as described above, the heat-shrinkable polyester film roll of the present invention can be suitably used in a processing such as printing.

The invention claimed is:

1. A heat-shrinkable polyester film roll comprising:
   a paper tube,
   a heat-shrinkable polyester film having a shrinking rate in a main shrinking direction of the film after treated in hot water at 90° C. for 10 seconds of 40% or more, and
   the film being wound around the paper tube to form the heat-shrinkable polyester film roll,
   wherein the heat-shrinkable polyester film and the film roll satisfy the following requirements (1) to (6):
   (1) a film winding length is 2000 m or more and 20000 m or less;
   (2) a film width is 400 mm or more and 2500 mm or less;
   (3) a film thickness is 5 μm or more and 30 μm or less;
   (4) unevenness in thickness in a film widthwise direction in a film roll surface layer part is 12% or less;
   (5) the paper tube has an inner diameter of 3 inches, a difference in clearance of the paper tube in a widthwise direction after removal of the film from the film roll is 0.5 mm or less, and a flat compressive strength of the paper tube after removal of the film is 1700 N/100 mm or more; and
   (6) an average value of winding hardness in a widthwise direction in the film roll surface layer part is 500 or more and 850 or less.

2. The heat-shrinkable polyester film roll according to claim 1, wherein a difference in clearance of the paper tube in the widthwise direction before winding the film is 0.3 mm or less.

3. The heat-shrinkable polyester film roll according to claim 2, wherein unevenness in thickness over the widthwise direction of the film of each sample sampled at intervals of 1000 m of the winding length from the surface layer part of the film roll is 12% or less in all samples.

4. The film roll comprising the heat-shrinkable polyester film according to claim 3, wherein both of a coefficient of static friction and a coefficient of dynamic friction between winding outside and winding inside of the film are 0.1 or more and 0.8 or less.

5. The film roll comprising the heat-shrinkable polyester film according to claim 2, wherein both of a coefficient of static friction and a coefficient of dynamic friction between winding outside and winding inside of the film are 0.1 or more and 0.8 or less.

6. The heat-shrinkable polyester film roll according to claim 1, wherein unevenness in thickness over the widthwise direction of the film of each sample sampled at intervals of 1000 m of the winding length from the surface layer part of the film roll is 12% or less in all samples.

7. The film roll comprising the heat-shrinkable polyester film according to claim 6, wherein both of a coefficient of static friction and a coefficient of dynamic friction between winding outside and winding inside of the film are 0.1 or more and 0.8 or less.

8. The film roll comprising the heat-shrinkable polyester film according to claim 1, wherein both of a coefficient of static friction and a coefficient of dynamic friction between winding outside and winding inside of the film are 0.1 or more and 0.8 or less.

* * * * *